United States Patent
Yoon et al.

(10) Patent No.: US 11,253,134 B2
(45) Date of Patent: Feb. 22, 2022

(54) DISHWASHER WITH HEAT PUMP

(71) Applicant: LG Electronics Inc., Seoul (KR)

(72) Inventors: Sangheon Yoon, Seoul (KR); Changyoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 128 days.

(21) Appl. No.: 16/698,273

(22) Filed: Nov. 27, 2019

(65) Prior Publication Data

US 2020/0163523 A1 May 28, 2020

(30) Foreign Application Priority Data

Nov. 28, 2018 (KR) .................. 10-2018-0150017

(51) Int. Cl.
*A47L 15/42* (2006.01)
*A47L 15/00* (2006.01)

(52) U.S. Cl.
CPC ....... *A47L 15/4223* (2013.01); *A47L 15/0031* (2013.01); *A47L 15/4244* (2013.01); *A47L 15/4285* (2013.01); *A47L 15/4287* (2013.01)

(58) Field of Classification Search
CPC ............ A47L 15/4223; A47L 15/4285; A47L 15/0031; A47L 15/4244; A47L 15/4287; A47L 2501/02; A47L 2501/06; A47L 2401/20; A47L 2401/09; A47L 15/4291; Y02B 40/00; Y02B 30/52
See application file for complete search history.

(56) References Cited

U.S. PATENT DOCUMENTS

| | | | |
|---|---|---|---|
| 2013/0319458 A1* | 12/2013 | Lim | A47L 15/4208 134/1 |
| 2015/0047679 A1* | 2/2015 | Dreossi | A47L 15/4291 134/25.2 |
| 2017/0188786 A1* | 7/2017 | Lee | A47L 15/4287 |

FOREIGN PATENT DOCUMENTS

| | | | | |
|---|---|---|---|---|
| EP | 2064982 B1 * | 6/2012 | | A47L 15/4291 |
| JP | 2008151439 A * | 7/2008 | | |
| KR | 100770071 | 10/2007 | | |
| KR | 101037921 | 5/2011 | | |
| KR | 101275554 B1 * | 6/2013 | | |
| WO | WO-2018228808 A1 * | 12/2018 | | A47L 15/4291 |

* cited by examiner

*Primary Examiner* — Michael E Barr
*Assistant Examiner* — Pallavi Chitta
(74) *Attorney, Agent, or Firm* — Fish & Richardson P.C.

(57) ABSTRACT

A dishwasher includes: a dishwasher body including a tub that defines a washing space and a sump disposed vertically below the tub and configured to accommodate washing water; a heat pump including a compressor, a condenser, an expansion apparatus, and an evaporator; a drain storage unit connected to a drain pipe of the sump and configured to receive washing water discharged from the sump; a drain pipe open-close valve that opens and closes the drain pipe; and a controller that controls the heat pump and the drain pipe open-close valve. The evaporator is configured to exchange heat with the drain storage unit, and the controller controls the drain pipe open-close valve to open the drain pipe to move washing water of the sump to the drain storage unit when the sump is drained.

20 Claims, 11 Drawing Sheets

DISHWASHER WITH HEAT PUMP

CROSS-REFERENCE TO RELATED APPLICATIONS

Pursuant to 35 U.S.C. § 119(a), this application claims the benefit of earlier filing date and right of priority to Korean Application No. 10-2018-0150017, filed on Nov. 28, 2018, the contents of which is incorporated by reference herein in its entirety.

TECHNICAL FIELD

The present disclosure relates to a dishwasher having a heat pump.

BACKGROUND

As is known, dishwasher is a type of appliance that cleans dishes and/or cooking utensils using detergent and washing water. Such a dishwasher includes a dishwasher body typically configured with a washing space therein and a door that opens and closes the washing space.

The dishwasher body includes a rack for accommodating and supporting dishes, a spray arm for spraying washing water to the rack, a supply pump for supplying washing water to the spray arm, and a drain pump for draining the washing water of the sump to an outside of the dishwasher body.

The dishwasher includes various washing courses including some or all of pre-washing, washing, rinsing, heating rinsing and drying processes.

On the other hand, the dishwasher body is provided with a heating unit for heating the washing water. The heating unit, for example, is composed of an electric heater for generating heat when power is applied to heat washing water.

However, in a dishwasher in the related art, washing water is heated using an electric heater, and thus there is a problem that a relatively large amount of power is consumed when washing water is heated. Furthermore, washing water heated to wash dishes is discharged to an outside of the dishwasher in a state having a high temperature (energy), and thus there is a problem that energy loss occurs.

In consideration of this problem, some of the dishwashers are designed to have a waste heat recovery device for recovering the waste heat of the dishwasher using a heat pump to heat water supply, and some of the other dishwashers are designed to arrange a condenser of the heat pump on a bottom surface of a cleaning tank to heat washing water inside the cleaning tank.

However, in a waste heat recovery device of a dishwasher using such a heat pump, in order to recover heat from washing water discharged from a dishwasher, a plurality of heat exchange apparatuses and a long passage for the movement of washing water are configured separately from the dishwasher, and thus there is a problem that the number of parts for heating of washing water and waste heat recovery and the size thereof are increased and the configuration and control thereof are complicated.

In addition, washing water to be supplied is heated using the heat of the washing water discharged after a washing process or after a rinsing process, and thus there is a problem that the washing water to be supplied cannot be preheated before the washing process. Due to this, there is a problem that it takes a relatively long time to heat washing water.

Moreover, in a dishwasher in which a condenser is disposed below a cleaning tank to heat washing water inside the cleaning tank, the heat energy of the condenser is transferred to washing water inside the cleaning tank through the cleaning tank, and thus there is a problem that energy loss increases while heating washing water.

Besides, in a dishwasher in which a condenser is disposed below a cleaning tank to heat washing water inside the cleaning tank, an evaporator heat exchange apparatus is provided to suppress the temperature of the evaporator from being excessively decreased when the operation of the heat pump is continued, and thus there is a problem that the configuration is complicated. In particular, in the evaporator heat exchange apparatus, water is accommodated to exchange heat with an evaporator inside a tank in which the evaporator is accommodated, and an additional heat exchanger is connected to the tank through a circulation passage to increase the temperature of water heat-exchanged with the evaporator inside the tank, and a pump is installed in the circulation passage to pump water, and thus there is a problem that power consumption increases during the operation of the pump.

In addition, the cleaning tank is accommodated inside the dishwasher body, and then a washing tank inside the cleaning tank is heated by the condenser after water is supplied to an inside of the cleaning tank, and thus there is a problem that a relatively long time is required to heat the washing water inside the cleaning tank.

PRIOR ART DOCUMENTS

Patent Documents (Patent Document 1) KR10-1037921 B1
(Patent Document 2) KR10-0770071 B1

SUMMARY

An aspect of the present disclosure is to provide a dishwasher having a heat pump capable of facilitating fabrication due to a simple configuration and suppressing an evaporator from being excessively cooled.

Another aspect of the present disclosure is to provide a dishwasher having a heat pump capable of suppressing the excessive cooling of the evaporator and suppressing the generation of energy loss while heating washing water.

Still another aspect of the present disclosure is to provide a dishwasher having a heat pump capable of suppressing the excessive cooling of the evaporator and shortening the heating time of washing water.

In order to achieve the foregoing objectives, the present disclosure provides a dishwasher having a heat pump, including a dishwasher body provided with a tub configured with a washing space therein and a sump provided at a bottom of the tub to temporarily accommodate washing water; a heat pump having a compressor, a condenser, an expansion apparatus and an evaporator; a drain storage unit connected to a drain pipe of the sump to temporarily store washing water discharged from the sump; a drain pipe open-close valve that opens and closes the drain pipe; and a controller that controls the heat pump and the drain pipe open-close valve, wherein the evaporator is disposed to exchange heat with the drain storage unit, and the controller controls the drain pipe open-close valve to open the drain pipe so as to move the washing water of the sump to the drain storage unit when the sump is drained.

According to an embodiment, the evaporator may be disposed inside the drain storage unit.

According to an embodiment, the dishwasher may further include a heat exchanger that accommodates the drain storage unit and the evaporator, respectively, to exchange heat with each other.

According to an embodiment, a heat transfer material may be accommodated inside the heat exchanger to be brought into contact with the drain storage unit and the evaporator at the same time.

According to an embodiment, the heat transfer material may be washing water, and the heat exchanger may include a washing water inlet pipe into which washing water flows, a washing water inlet pipe valve that opens and closes the washing water inlet pipe, and a water level sensing unit that senses a level of the heat transfer material, and the controller may sense a level of the heat transfer material by the water level sensing unit, and control the washing water inlet pipe valve to open the washing water inlet pipe so as to allow washing water to flow into the heat exchanger when reaching a preset level.

According to an embodiment, the drain storage unit may have a through portion configured to pass therethrough to increase a contact area with the heat transfer material.

According to an embodiment, the drain storage unit may be provided with a communication pipe to allow the inside and the outside of the drain storage unit to communicate with each other.

According to an embodiment, the dishwasher may further include a drain pump that pumps washing water inside the drain storage unit, wherein the controller controls the drain pump to drain the washing water of the drain storage unit when a preset period of time elapses.

According to an embodiment, the evaporator and the drain storage unit may be provided in an inner space of the dishwasher body installed with the compressor.

According to an embodiment, one side of the compressor may be provided with a blower fan that blows air that has passed through the compressor toward the evaporator and the drain storage unit.

According to an embodiment, the dishwasher may further include an air guide that guides air that has passed through the compressor toward the evaporator and the drain storage unit.

According to an embodiment, the evaporator and the drain storage unit may be provided inside an air flow space defined by the air guide.

According to an embodiment, the compressor may be provided inside the air guide.

According to an embodiment, the condenser may be disposed in direct contact with the washing water to directly heat the washing water.

The condenser may be provided inside the sump.

The dishwasher body may be provided with a water jacket having a washing water storage unit in which washing water is stored to communicate with the sump, and the condenser may be provided inside the washing water storage unit.

The water jacket may be provided with a connection pipe to move the washing water of the washing water storage unit to the sump.

The connection pipe may be provided with an open-close valve that opens and closes an internal passage.

The water jacket may be provided with a water jacket temperature sensing unit that senses the temperature of the washing water of the washing water storage unit.

The controller may control the open-close valve to move the washing water of the washing water storage unit to the sump when the heating of the washing water of the washing water storage unit is completed.

A circulation pump that circulates the washing water of the sump may be connected to the sump, and an electric heater that heats washing water and a temperature sensing unit that senses the temperature of the washing water may be provided inside the circulation pump.

The sump may be provided with a filter unit that suppresses the movement of contaminants contained in washing water, and the filter unit may include a first filter provided at an upper opening of the sump, a second filter provided inside the sump, and a third filter provided inside the second filter.

The condenser may be provided between the first filter and the second filter.

The evaporator may include a plurality of horizontal sections arranged in parallel with one another and a plurality of connection sections that connect the plurality of horizontal sections to communicate with one another.

As described above, according to an embodiment of the present disclosure, a drain storage unit for temporarily storing washing water drained from a sump may be provided to exchange heat with the evaporator, thereby facilitating fabrication due to a simple configuration and suppressing the evaporator from being excessively cooled.

Furthermore, the drain storage unit and the evaporator may be configured to exchange heat, and the condenser may be configured to be in direct contact with washing water to directly heat the washing water, thereby suppressing energy loss from being generated while heating the washing water.

As a result, the operating efficiency of the heat pump may be improved.

In addition, the drain storage unit and the evaporator may be configured to exchange heat, and the condenser may be configured to be in direct contact with washing water to heat the washing water, thereby significantly reducing the heating time of the washing water.

Moreover, the evaporator may be disposed inside the drain storage unit, thereby promoting heat exchange between the washing water and the evaporator.

Besides, a heat exchanger in which the drain storage unit and the evaporator are accommodated to exchange heat may be provided, thereby suppressing contact between contaminated washing water discharged from the sump and the evaporator. As a result, the contamination of the evaporator may be suppressed.

Furthermore, the drain storage unit and the evaporator may be provided in a space installed with the compressor, and thus the evaporator absorbs heat energy released from the compressor to increase the temperature of the evaporator.

In addition, a blower fan may be provided on one side of the compressor to transfer air that has passed through the compressor to the evaporator and the drain storage unit, thereby increasing the temperature of the evaporator to increase the temperature of the evaporator.

Moreover, an air guide for guiding air that has passed through the compressor to the evaporator and the drain storage unit, thereby increasing the temperature of the evaporator.

BRIEF DESCRIPTION OF THE DRAWING

The accompanying drawings, which are included to provide a further understanding of the disclosure and are incorporated in and constitute a part of this specification, illustrate one or more implementations of the disclosure and together with the description serve to explain the principles of the disclosure.

DETAILED DESCRIPTION

Figure 1:
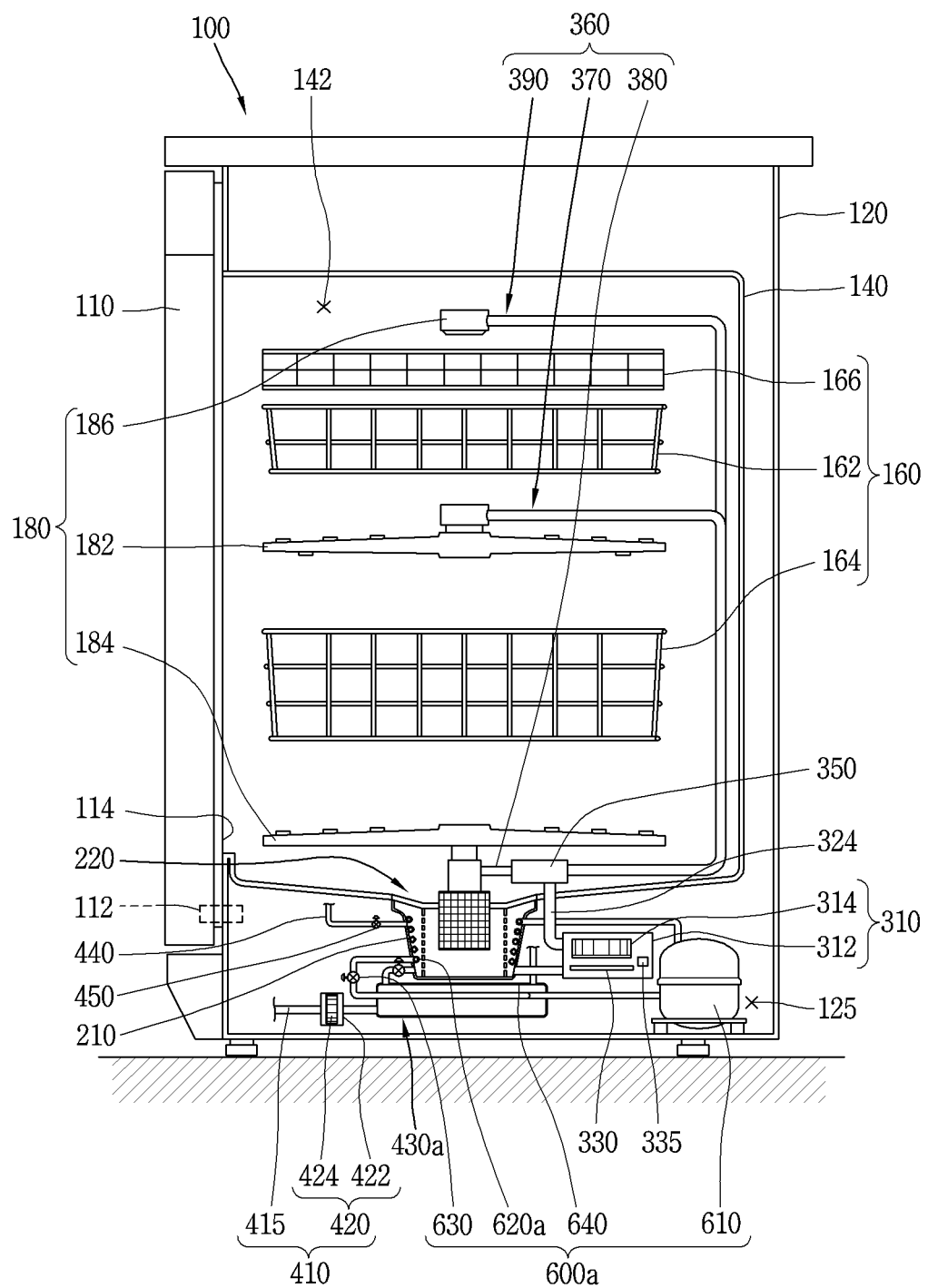
FIG. 1 is a cross-sectional view of a dishwasher having a heat pump according to an embodiment of the present disclosure.

Hereinafter, preferred embodiments disclosed in the present disclosure will be described in detail with reference to the accompanying drawings. Even in different embodiments according to the present disclosure, the same or similar reference numerals are designated to the same or similar configurations, and the description thereof will be substituted by the earlier description. A singular representation used in the present disclosure may include a plural representation as far as it represents a definitely different meaning from the context. In describing the embodiments disclosed herein, moreover, the detailed description will be omitted when specific description for publicly known technologies to which the invention pertains is judged to obscure the gist of the present invention. Also, it should be noted that the accompanying drawings are merely illustrated to easily explain the concept of the invention, and therefore, they should not be construed to limit the technological concept disclosed herein by the accompanying drawings.

Figure 2:
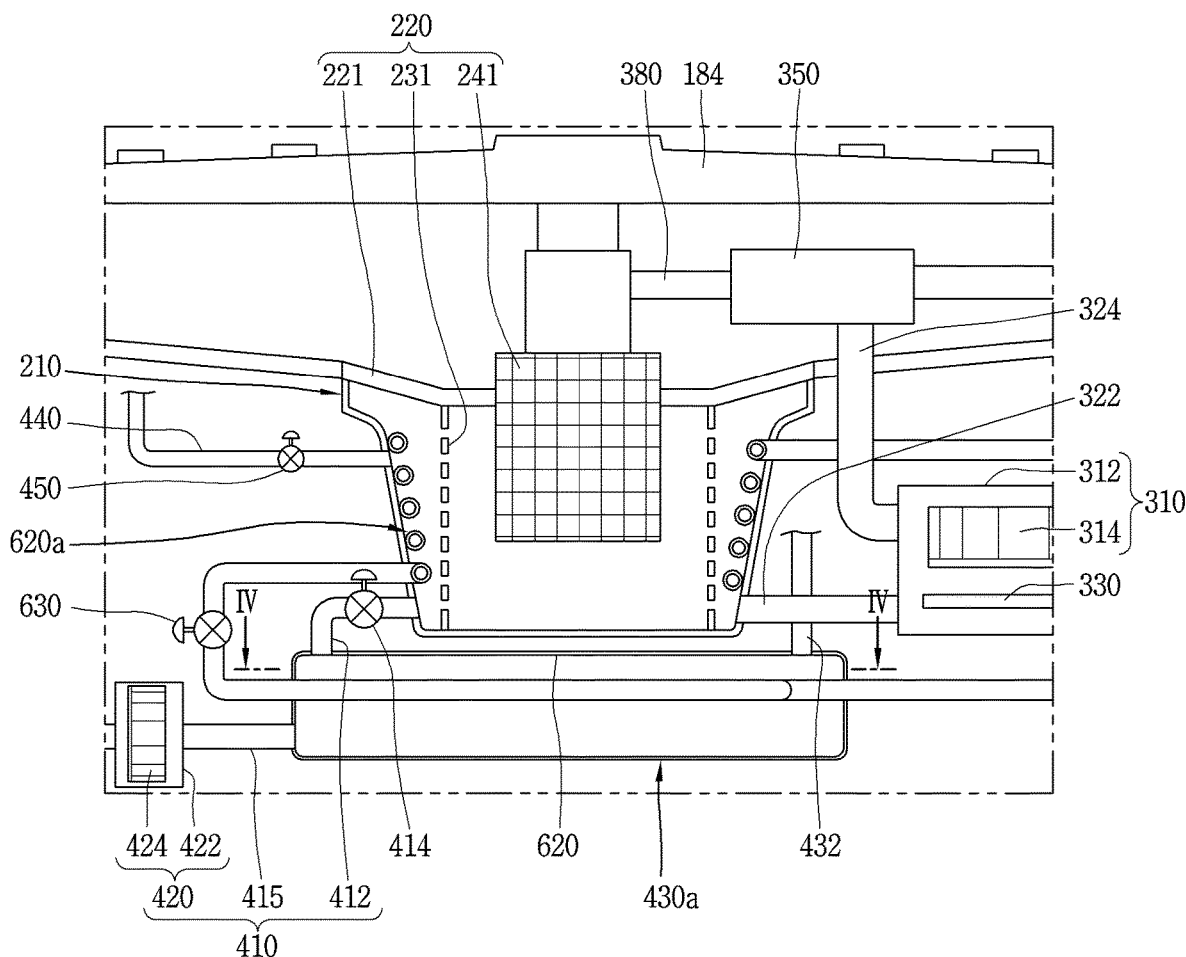
FIG. 2 is a partially enlarged view of FIG. 1.

FIG. 1 is a cross-sectional view of a dishwasher having a heat pump according to an embodiment of the present disclosure, and FIG. 2 is a partially enlarged view of FIG. 1. As illustrated in FIGS. 1 and 2, a dishwasher having a heat pump according to an embodiment of the present disclosure includes a dishwasher body 100 provided with a washing space 142 and a door 110 that opens and closes the washing space 142. The dishwasher body 100 includes a cabinet 120 forming an appearance. The cabinet 120 has a substantially rectangular parallelepiped shape. A tub 140 is provided inside the cabinet 120. The tub 140 is configured with a washing space 142 having an open front surface therein. The door 110 opens and closes the front opening of the tub 140 while rotating vertically around a hinge 112 provided at the bottom. The door 110 hermetically blocks the front opening of the tub 140. A gasket 114 for hermetically blocking the front opening of the tub 140 is provide in a mutual contact region between the door 110 and the dishwasher body 100.

The rack 160 for accommodating dishes is provided inside the tub 140. The rack 160 includes an upper rack 162 provided in an inner upper region of the tub 140. The rack 160 includes a lower rack 164 provided below the tub 140. The rack 160 includes a top rack 166 provided in an inner ceiling region of the tub 140. The top rack 166 is disposed above the upper rack 162.

An inside of the tub 140 is provided with a spray arm 180 for spraying washing water. For example, the spray arm 180 is implemented to spray toward the rack 160. The spray arm 180 has an upper spray arm 182 for spraying toward the upper rack 162. The spray arm 180 has a lower spray arm 184 for spraying toward the lower rack 164. The spray arm 180 has a top spray arm 186 for spraying washing water toward the top rack 166. The upper spray arm 182 is provided below the upper rack 162. The lower spray arm 184 is provided below the lower rack 164. The top spray arm 186 is provided above the top rack 166.

The bottom of the tub 140 is provided with a sump 210 for collecting washing water. The sump 210 is implemented in an upwardly open cylindrical shape. A bottom surface of the tub 140 is configured to be inclined. An upper opening of the sump 210 is disposed in a lower region of the bottom surface of the tub 140. As a result, washing water inside the tub 140 is collected into the sump 210 through the upper opening of the sump 210. One side of the sump 210 is provided with a connection pipe 440 connected to supply washing water into the sump 210. The connection pipe 440 is provided with a connection pipe open-close valve 450 that opens and closes an internal passage. Another side of the sump 210 is configured with a drain unit 410 for draining the washing water of the sump 210. The drain unit 410 has a drain passage 415 through which washing water flows to the outside and a drain pump 420 provided in the drain passage 415 to pump washing water. The drain pump 420 has a housing 422 and an impeller 424 rotatably provided inside the housing 422. Still another side of the sump 210 is provided with a circulation pump 310 for pumping and circulating washing water.

The circulation pump 310 has a housing 312 and an impeller 314 rotatably provided inside the housing 312. One side of the housing 312 is provided with a suction pipe 322 for sucking washing water inside the sump 210. An electric heater 330 for heating washing water is provided inside the circulation pump 310 (housing 312). A temperature sensing unit 335 for sensing the temperature of washing water is installed inside the circulation pump 310. The other side of the housing 312 is connected to a discharge pipe 324 for discharging washing water. The discharge pipe 324 is provided with a passage switching valve 350 for switching a passage of washing water.

The passage switching valve 350 is provided with a washing water guide 360 for guiding the washing water. The washing water guide 360 has an upper guide 370 connected to the upper spray arm 182. The washing water guide 360 has a lower guide 380 connected to the lower spray arm 184. The washing water guide 360 has a top guide 390 connected to the top spraying arm 186. The passage switching valve 350 is configured to switch the passage of the washing water to selectively move washing water pumped by the circulation pump 310 to the upper guide 370, the lower guide 380, and the top guide 390. The dishwasher body 100 is provided with a heat pump 600a to heat washing water.

Figure 3:
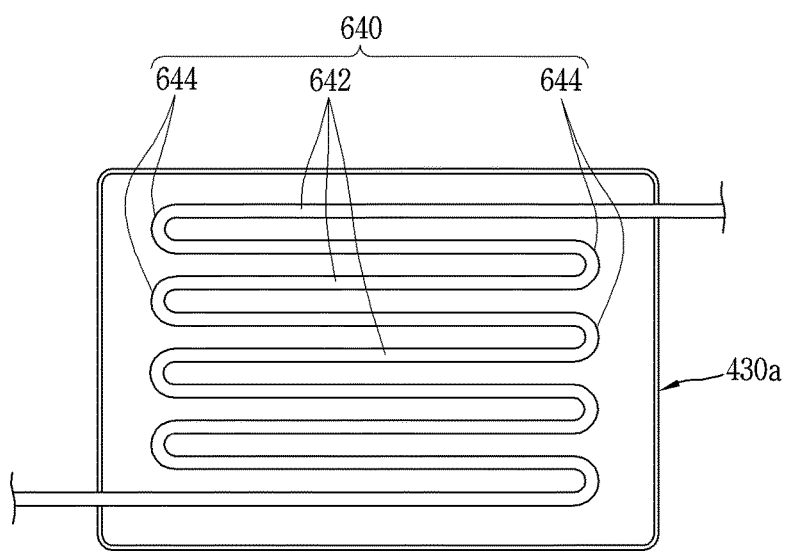
FIG. 3 is a cycle diagram of the heat pump in FIG. 1.

FIG. 3 is a cycle diagram of the heat pump in FIG. 1. As illustrated in FIG. 3, the heat pump 600a includes a compressor 610 for compressing refrigerant, a condenser 620a for condensing refrigerant by heat radiation, an expansion apparatus 630 for depressurizing and expanding refrigerant, and an evaporator 640 for absorbing surrounding latent heat to evaporate. The compressor 610, the condenser 620a, the expansion apparatus 630, and the evaporator 640 are connected to communicate with one another by a refrigerant pipe to circulate (flow) refrigerant.

The compressor 610 is disposed inside the cabinet 120. A machine room 125 is disposed at a lower side of the tub 140 inside the cabinet 120. The compressor 610 is provided inside the machine room 125. The condenser 620a is provided to directly heat washing water inside the tub 140. More specifically, for example, the condenser 620a is provided inside the sump 210 to be in direct contact with washing water inside the sump 210. As a result, the washing water inside the sump 210 may be directly heated, and thus, energy loss may be suppressed while heating the washing water. Here, the condenser 620a may be referred to as a sump condenser since the condenser 620a heats the washing water of the sump 210. An inlet end portion of the condenser 620a is connected to the compressor 610, and an outlet end portion of the condenser 620a is connected to the evaporator 640. The expansion apparatus 630 is provided between the condenser 620a and the evaporator 640.

The sump 210 is provided with a filter unit 220 to suppress the movement of contaminants contained in washing water. The filter unit 220 has a first filter 221 provided in an upper opening of the sump 210. The filter unit 220 includes a second filter 231 provided inside the sump 210. The filter unit 220 includes a third filter 241 provided inside the second filter 231. The condenser 620a is disposed between the first filter 221 and the second filter 231. As a result, the access of contaminants contained in washing water to the condenser 620a may be suppressed.

On the other hand, one side of the sump 210 is provided with a drain unit 410 for draining washing water therein. The drain unit 410 includes a drain pipe 412 connected to communicate with the sump 210, and a drain storage part 430a connected to the drain pipe 412 to temporarily store washing water. The drain storage unit 430a is configured with a size capable of accommodating washing water having a predetermined capacity. One side of the drain storage unit 430a is provided with a communication pipe 432 for communicating the inside and outside of the drain storage unit 430a. The drain pipe 412 is provided with a drain pipe open-close valve 414 that opens and closes the passage therein. A drain passage 415 is connected to one side of the drain storage unit 430a to drain the washing water of the drain storage unit 430a. The drain passage 415 is provided with a drain pump 420 to pump the washing water of the drain storage unit 430a. The drain pump 420 has a housing 422 and an impeller 424 rotatably provided inside the housing 422. The evaporator 640 is provided in the drain storage unit 430a to be heat-exchangeable.

Figure 4:
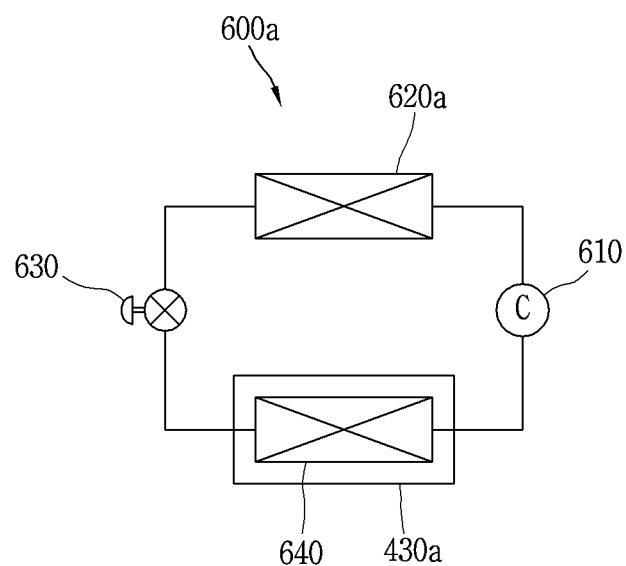
FIG. 4 is a plan view illustrating an arrangement state of the evaporator in FIG. 2.

FIG. 4 is a plan view illustrating an arrangement state of the evaporator in FIG. 2. As illustrated in FIG. 4, the evaporator 640 is configured to exchange heat with washing water inside the drain storage unit 430a. The evaporator 640 is configured to exchange heat in direct contact with washing water inside the drain storage unit 430a. The evaporator 640 includes a plurality of horizontal sections 642 arranged in parallel with one another and a plurality of connection sections 644 connecting the horizontal sections 642 to communicate with one another. In the present embodiment, it is illustrated that the evaporator 640 is disposed on the same plane inside the drain storage unit 430a, but it is merely an example, and the shape of the evaporator 640 may be configured to have another shape, for example, it may be configured to have a rectangular parallelepiped shape.

Figure 5:
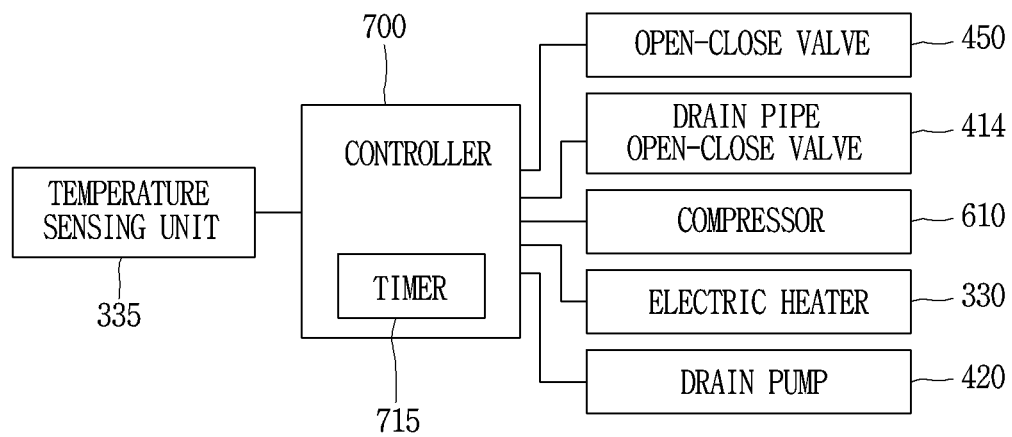
FIG. 5 is a control block diagram of the dishwasher in FIG. 1.

FIG. 5 is a control block diagram of the dishwasher in FIG. 1. As illustrated in FIG. 5, a dishwasher according to the present embodiment is configured to include a controller 700 implemented as a microprocessor provided with a control program. A temperature sensing units 335 for sensing the temperature of the washing water is connected to the controller 700 in a communicable manner. The controller 700 is controllably connected to the connection pipe open-close valve 450 to control washing water supplied to the sump 210. An electric heater 330 is controllably connected to the controller 700 so as to heat the washing water if necessary.

On the other hand, the compressor 610 of the heat pump 600a is controllably connected to the controller 700 to heat the washing water of the sump (210). The drain pipe open-close valve 414 is controllably connected to the controller 700 to temporarily store the washing water of the sump 210 in the drain storage unit 430a. The drain pump 420 is controllably connected to the controller 700 to drain the washing water of the drain storage unit 430a. The controller 700 is configured to control the drain pipe open-close valve 414 and the drain pump 420 so that the washing water of the drain storage unit 430a and the evaporator 640 may exchange heat for a preset period of time. As a result, the temperature of the evaporator 640 the temperature of which is lowered by the latent heat absorption of the evaporator 640 may be increased by exchanging heat with washing water having a relatively high temperature in the drain storage unit 430a. The controller 700 is provided with a timer 715 for calculating a heat exchange time between the washing water of the drain storage unit 430a and the evaporator 640.

By such a configuration, when washing or rinsing dishes using the heated washing water, the controller 700 controls the connection pipe open-close valve 450 to supply washing water into the sump 210. When washing water is supplied into the sump 210, the controller 700 may control the compressor 610 of the heat pump 600a to be driven so as to heat the washing water of the sump 210 by the heat pump 600a. When the compressor 610 is driven, compressed refrigerant is moved to the condenser 620a to be condensed by exchanging heat with washing water inside the sump 210. The refrigerant condensed by being heat radiated by the condenser 620a is moved to the evaporator 640 to absorb surrounding latent heat from the evaporator 640 to evaporate. The refrigerant evaporated from the evaporator 640 repeatedly performs the processes of being sucked into the compressor 610 to be compressed and discharged, and being heat exchanged in the condenser 620a.

The washing water heat-exchanged with the condenser 620a is pumped by the circulation pump 310 and moved to the respective spray arms 180. The washing water moved to the respective spray arms 180 is sprayed to the relevant rack 160 to wash dishes stored in the relevant rack 160.

On the other hand, when the dish washing (or rinsing) process is completed, the controller 700 controls the drain pipe open-close valve 414 to temporarily store the washing water of the sump 210 in the drain storage unit 430a. When relatively high temperature washing water discharged from the sump 210 flows into the drain storage unit 430a, the evaporator 640 exchanges heat with the washing water to increase the temperature. The controller 700 calculates a heat exchange time between the washing water and the evaporator 640 through the timer 715, and controls the drain pump 420 when a preset time reaches to discharge washing water inside the drain storage unit 430a.

Hereinafter, another embodiment of the present disclosure will be described with reference to FIGS. 6 and 10.

Figure 6:
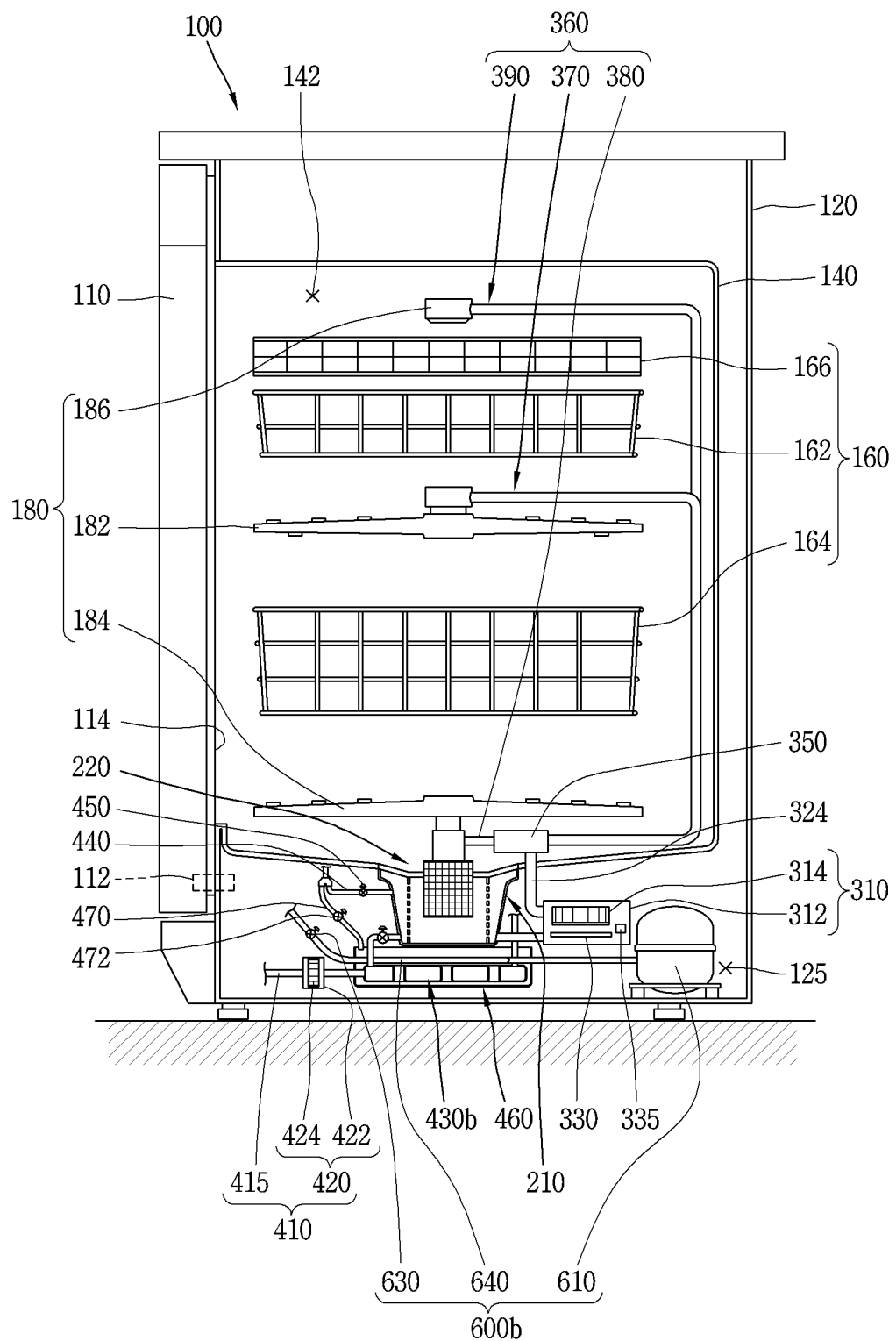
FIG. 6 is a cross-sectional view of a dishwasher having a heat pump according to another embodiment of the present disclosure.
Figure 7:
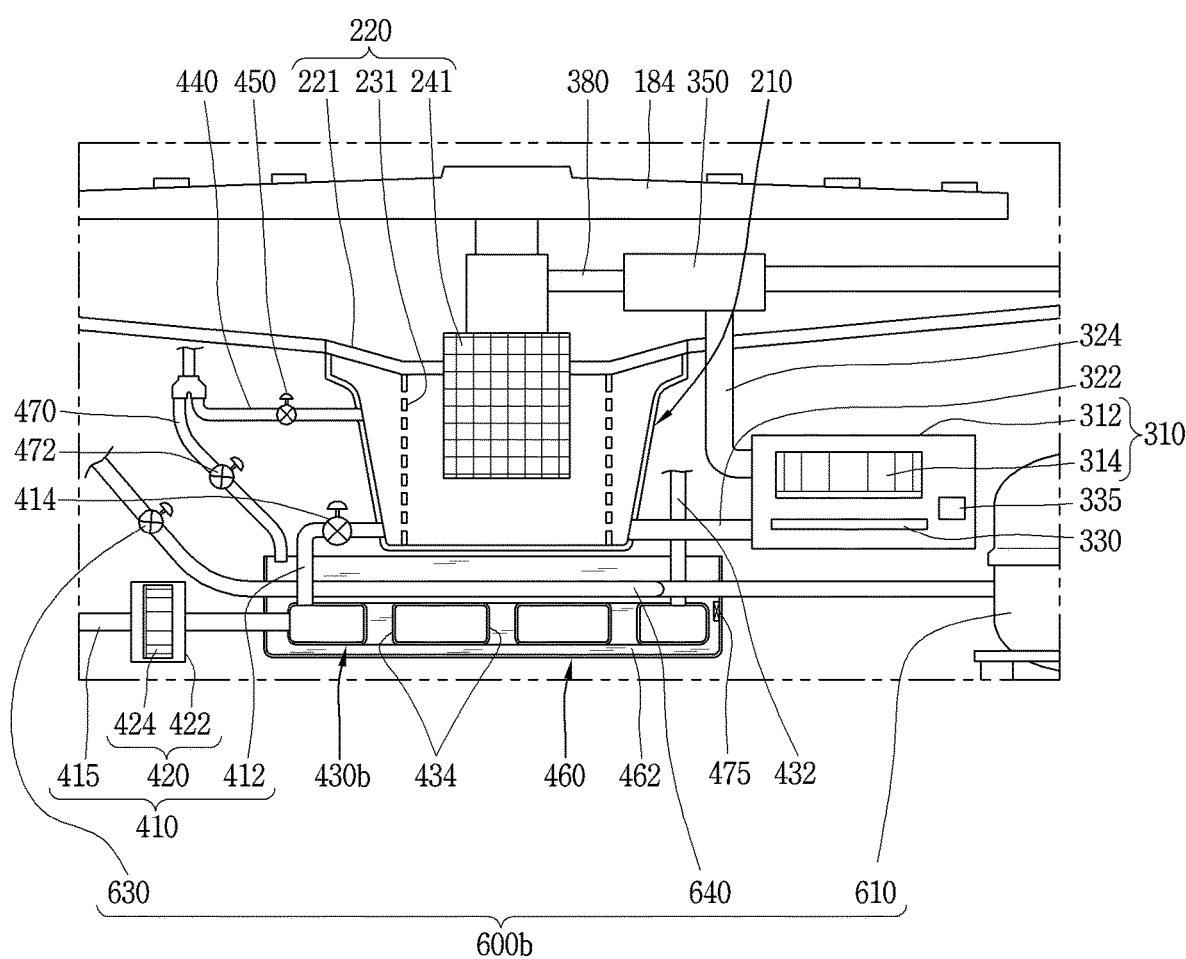
FIG. 7 is a partially enlarged view of FIG. 6.

FIG. 6 is a cross-sectional view of a dishwasher having a heat pump according to another embodiment of the present disclosure, and FIG. 7 is a partially enlarged view of FIG. 6. As illustrated in FIGS. 6 and 7, a dishwasher of the present embodiment includes a dishwasher body 100 having a tub 140 configured with a washing space 142 therein and a sump provided at a bottom of the tub 140 to temporarily accommodate washing water; a heat pump 600b having a compressor 610, a condenser 620b disposed in direct contact with washing water to be heated, an expansion apparatus 630 and an evaporator 640; a drain storage unit 430b connected to a drain pipe 412 of the sump 210 to temporarily store washing water discharged from the sump 210; a drain open-close valve 414 configured to open and close the drain pipe 412; and a controller 700 (see FIG. 11) configured to control the heat pump 600b and the drain pipe open-close valve 414, wherein the evaporator 640 is disposed to exchange heat with the drain storage unit 430b; and the controller 700 is configured to control the drain pipe open-close valve 414 to move the washing water of the sump 210 to the drain storage unit 430b when the sump 210 is drained.

As described above, the rack 160 for accommodating dishes is provided inside the tub 140. The rack 160 has an upper rack 162, a lower rack 164, and a top rack 166. An inside of the tub 140 is provided with a spray arm 180 for spraying washing water. The spray arm 180 includes an upper spray arm 182, a lower spray arm 184, and a top spray arm 186. The sump 210 is connected to a connection pipe 440 for supplying washing water. The connection pipe 440 is provided with a connection pipe open-close valve 450 that opens and closes the passage. One side of the sump 210 is provided with a circulation pump 310. A passage switching valve 350 is connected to the discharge pipe of the circulation pump 310. The passage switching valve 350 is connected to a washing water guide 360 for guiding washing water. The washing water guide 360 has an upper guide 370, a lower guide 380, and a top guide 390. The sump 210 is provided with a filter unit 220 to suppress the movement of contaminants. The filter unit 220 may include, for example, a first filter 221 provided in an upper opening of the sump 210, a second filter 231 provided below the first filter 221, and the a third filter 241 provided inside the second filter 231.

The dishwasher body 100 is provided with a water jacket 500 in which washing water is temporarily stored. The water jacket 500 is provided on, for example, one sidewall of the dishwasher body 100. More specifically, the water jacket 500 is provided in a space between the left sidewall of the cabinet 120 and the left sidewall of the tub 140.

Figure 8:
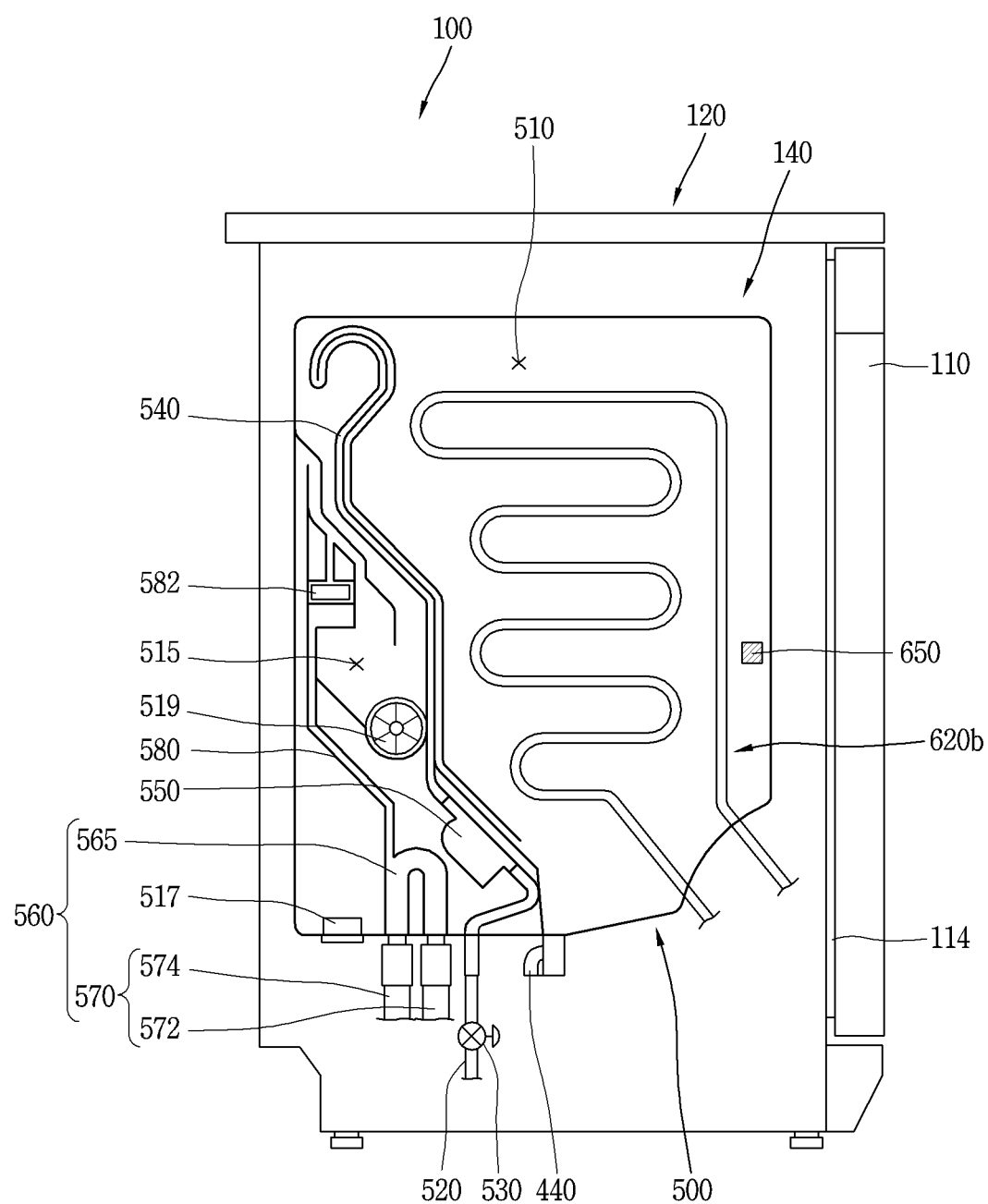
FIG. 8 is a cross-sectional view of a water jacket region of the dishwasher in FIG. 6.

FIG. 8 is a cross-sectional view of a water jacket region of the dishwasher in FIG. 6. As illustrated in FIG. 8, the water jacket 500 includes a washing water storage unit 510 for storing washing water therein. A water pipe 520 is connected to one side of the water jacket 500. The water pipe 520 is provided with a water valve 530 that opens and closes the passage. The water jacket 500 is provided with a connection pipe 440 to move the washing water of the washing water storage unit 510 to the sump 210. The water pipe 520 is connected to an inflow passage 540 into which washing water flows. The inflow passage 540 is extended upward to horizontally partition an inner space of the water jacket 500. A condensation space 515 is disposed at the other side of the inflow passage 540. The inflow passage 540 is provided with a flow meter 550 to sense a flow rate of washing water.

The other side of the water jacket 500 is configured with a discharge passage 560 for discharging washing water. The drain passage 415 includes the discharge passage 560. The discharge passage 560 is located in the condensation space 515. The discharge passage 560 includes a drain connection portion 565 having an inverted "U" shape and a drain pipe 570 connected to the drain connection portion 565. The drain pipe 570 includes a first drain pipe 572 connected to the drain pump 420 and a second drain pipe 574 one end of which is extended to the outside. The condensation space 515 is provided with a ventilation portion 517 communicating with the outside. The ventilation portion 517 is provided with a communication hole 519. The communication hole 519 communicates with an inner space of the tub 140. One side of the drain connection portion 565 is provided with a condensate discharge passage 580 to discharge condensate. The condensate discharge passage 580 is connected to the discharge passage 560. The condensate discharge passage 580 is provided with a drain valve 582. The drain valve 582 is implemented as a check valve to block fluid from moving upward and to allow the fluid to move downward. The water jacket 500 is provided with a condenser 620b to directly heat the washing water of the washing water storage unit 510. Here, the condenser 620b may be referred to as a water jacket condenser since the condenser 620ab heats the washing water of the water jacket 500. The water jacket 500 is provided with a water jacket temperature sensing unit 650 for sensing the temperature of the washing water heated by the condenser 620b.

The dishwasher body 100 is provided with a heat pump 600b configured to directly heat washing water. The heat pump 600b includes a compressor 610 for compressing refrigerant, a condenser 620b for condensing refrigerant by heat dissipation, an expansion apparatus 630 for depressurizing and expanding refrigerant, and an evaporator 640 for allowing refrigerant to absorb latent heat to evaporate. The compressor 610, the expansion apparatus 630, and the evaporator 640 are provided inside the machine room 125. The condenser 620b is provided in the water jacket 500 to directly heat the washing water of the water jacket 500.

Meanwhile, referring again to FIGS. 6 and 7, still another side of the sump 210 is provided with a drain storage unit 430b for temporarily storing washing water discharged from the sump 210. One side of the drain storage unit 430b is provided with the evaporator 640 to be heat exchangeable.

The dishwasher of the present embodiment includes a heat exchanger 460 in which the drain storage unit 430b and the evaporator 640 are accommodated.

The heat exchanger 460 has a cylindrical shape configured with an accommodation space therein. The heat exchanger 460 accommodates a heat transfer material 462 therein. The heat transfer material 462 is implemented as, for example, washing water. The heat exchanger 460 is provided with a washing water inlet pipe 470 to allow washing water to flow thereinto. The washing water inlet pipe 470 may be configured to be branched from, for example, the connection pipe 440. The washing water inlet pipe 470 is provided with a washing water inlet pipe valve 472 to open and close a passage of the washing water inlet pipe 470. In the present embodiment, it is illustrated that the heat exchanger 460 has an upwardly open cylindrical shape, and the washing water inlet pipe 470 is provided to supply washing water therein, but it is merely an example, and the heat exchanger 460 may be implemented in a sealed cylindrical shape.

Figure 9:
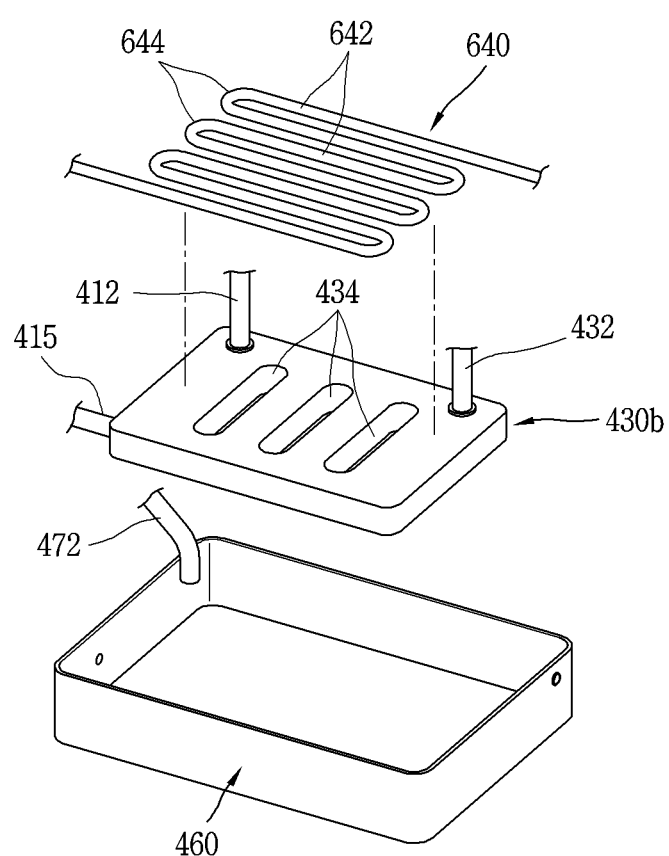
FIG. 9 is a perspective view illustrating an arrangement state of a drain storage unit, an evaporator and a heat exchanger in FIG. 6.

FIG. 9 is a perspective view illustrating an arrangement state of a drain storage unit, an evaporator and a heat exchanger in FIG. 6. As illustrated in FIG. 9, the drain storage unit 430b is provided with a washing water storage space for temporarily washing water therein. For example, the drain storage unit 430b may include a plurality of through portions 434 to increase a contact area between inside washing water and an outside heat transfer material 462 (washing water). One side of the drain storage unit 430b is connected to the drain pipe 412 one end of which is connected to the sump 210. Another side of the drain storage unit 430b is connected to a communication pipe 432. The communicating pipe 532 may be extended upwardly higher than a water level of washing water inside the tub 140. A drain pump 420 is connected to still another side of the drain storage unit 430b.

The heat exchanger 460 is implemented in a cylindrical shape configured with a receiving space therein. It is illustrated a case where the heat exchanger 460 of the present embodiment is implemented in a substantially rectangular parallelepiped shape, but it is merely an example, and the heat exchanger 460 of the present embodiment may be configured to have a cylindrical or other polygonal shapes. One side (upper side in the drawing) of the heat exchanger 460 is connected to a washing water inlet pipe 470 to allow washing water to flow into the inside. A water level sensing unit 475 for sensing a level of washing water may be provided inside the heat exchanger 460.

Figure 10:
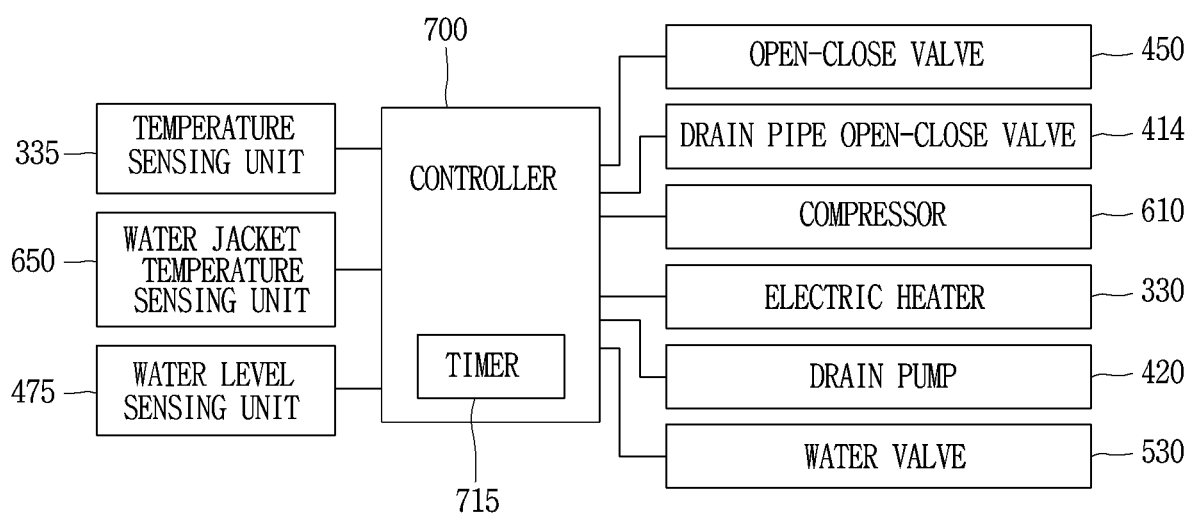
FIG. 10 is a control block diagram of the dishwasher in FIG. 6.

FIG. 10 is a control block diagram of the dishwasher in FIG. 6. As illustrated in FIG. 10, a dishwasher according to the present embodiment is configured to include a controller 700 implemented as a microprocessor provided with a control program. A temperature sensing units 335 for sensing the temperature of washing water and a water jacket temperature sensing unit 650 are respectively connected to the controller 700 in a communicable manner. The controller 700 is communicatively connected to a water level sensing unit 475 for sensing a level of washing water inside the heat exchanger 460. A water valve 530 is controllably connected to the controller 700 to supply washing water to the water jacket 500. The controller 700 is connected to an open-close valve 700 to supply the washing water of the sump 210. The controller 700 is controllably connected to a drain pipe open-close valve 414 to drain the washing water of the sump 210. An electric heater 330 is controllably connected to the controller 700 to heat the washing water of the sump 210 when necessary. A drain pump 420 is controllably connected to the controller 700 to drain the washing water of the drain storage unit 430b. The controller 700 is provided with a timer 715 to calculate a time for exchanging heat between the washing water of the drain storage unit 430b and the evaporator 640. Here, the controller 700 may be configured to control the water valve 530 to supply washing water to the washing water storage unit 510 prior to exchanging heat between the drain storage unit 430b and the evaporator 640. In addition, the controller 700 may be configured to control the compressor 610 such that the compressor 610 is driven when exchanging heat between the drain storage unit 430b and the evaporator 640. As a result, heat energy absorbed by the evaporator 640 may be used to heat the washing water of the washing water storage unit 510 of the water jacket 500. The controller 700 is controllably connected to a washing water inlet pipe valve 472 to supply washing water to an inside of the heat exchanger 460.

By this configuration, when washing or rinsing the dishes using the heated washing water, the controller 700 controls the water valve 530 to supply washing water into the washing water storage unit 510 of the water jacket 500. The controller 700 may control the compressor 610 to move refrigerant to the condenser 620b provided in the water jacket 500 so as to drive the compressor 610. The controller 700 controls the connection pipe open-close valve 450 when the washing water of the water jacket 500 is heated to a preset temperature to supply the heated washing water of the water jacket 500 to the sump 210. When washing water is supplied to the sump 210, the controller 700 may control the circulation pump 310 to spray the washing water to dishes through the relevant spray arm 180.

On the other hand, the controller 700 may control the drain pipe open-close valve 414 to discharge the washing water of the sump 210 to the drain storage unit 430b when washing (or rinsing) using the heated washing water is completed. When the drain pipe open-close valve 414 is opened, the washing water of the sump 210 may be moved into the drain storage unit 430b. When the washing water of the sump 210 is moved to the drain storage unit 430b, the controller 700 exchanges heat between the washing water of the drain storage unit 430b and the washing water of the heat exchanger 460. As a result, the temperature of the washing water of the heat exchanger 460 is increased. In addition, the washing water of the heat exchanger 460 and the evaporator 640 exchange heat with each other to increase the temperature of the evaporator 640. The controller 700 may calculate the heat exchange time of the evaporator 640, and when a preset period of time elapses, the controller 700 may control the drain pump 420 to discharge the washing water of the drain storage unit 430b to the outside. Even though the washing water of the drain storage unit 430b is drained, the washing water of the heat exchanger 460 continues to exchange heat with the evaporator 640 in a temperature increased state, thereby increasing or maintaining the temperature of the evaporator 640. When a level of heat exchange material of the heat exchanger 460 is lower than a predetermined level by the water level sensing unit 475, the controller 700 controls the washing water inlet pipe valve 472 to allow washing water to flow into the heat exchanger 160 through the washing water inlet pipe 470.

Hereinafter, still another embodiment of the present disclosure will be described with reference to FIGS. 11 to 13.

Figure 11:
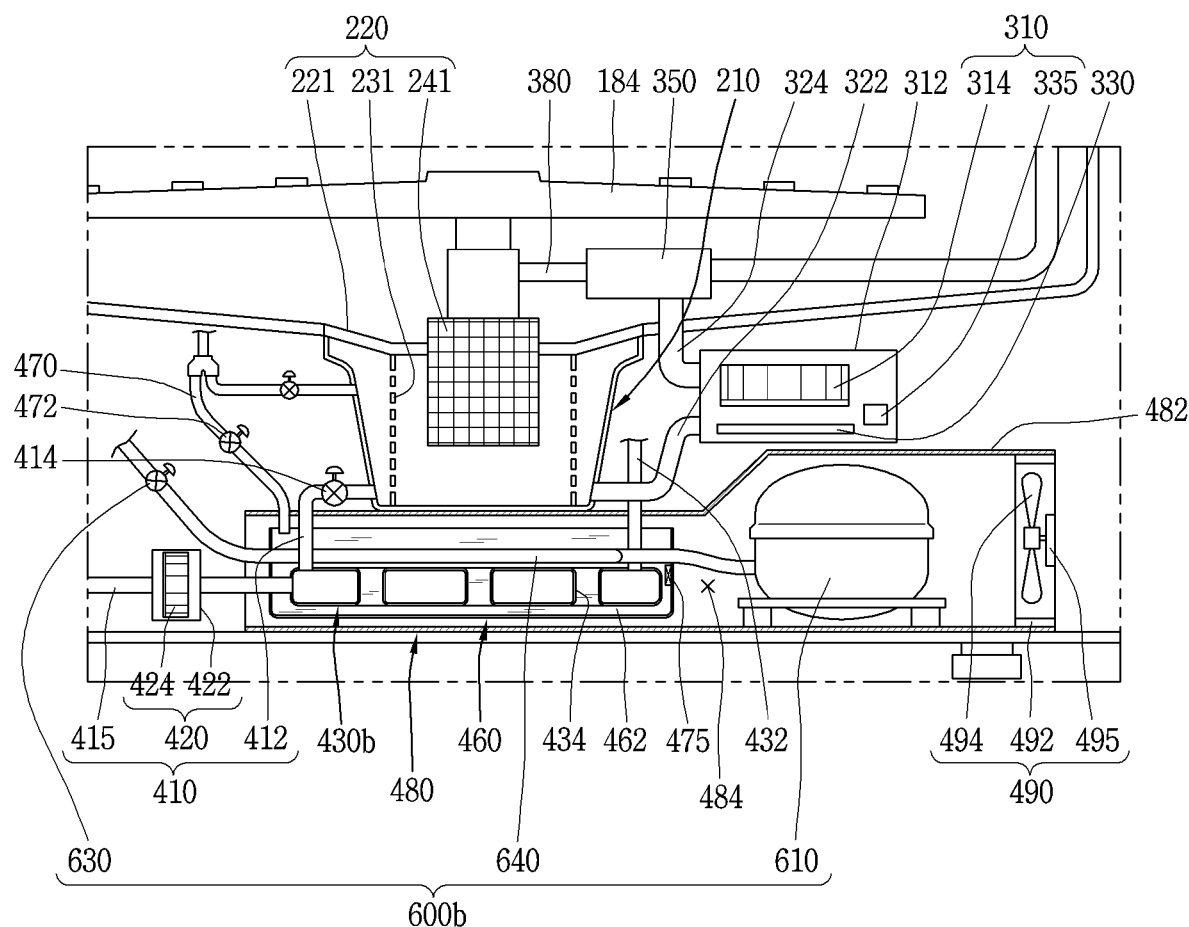
FIG. 11 is a partially enlarged view of a dishwasher having a heat pump according to another embodiment of the present disclosure.
Figure 12:
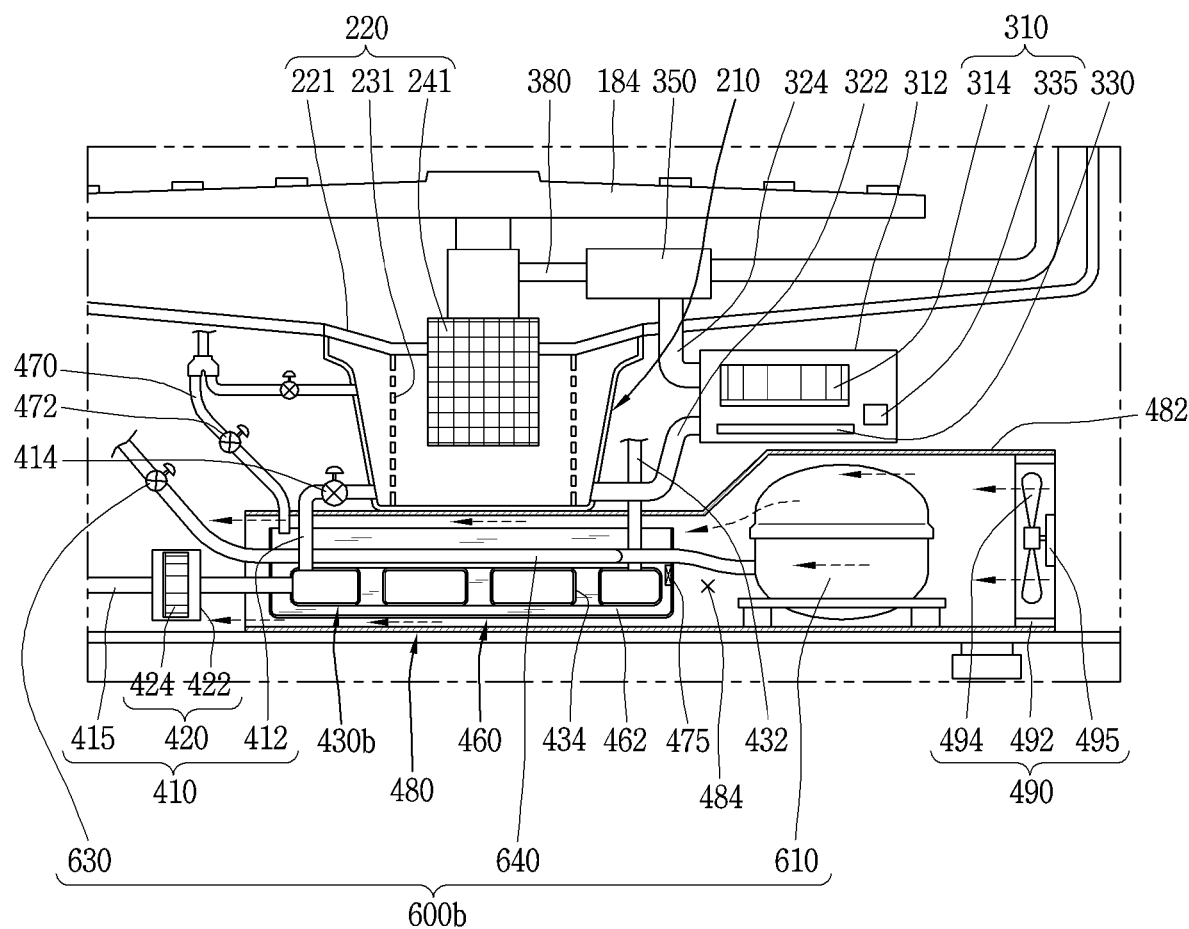
FIG. 12 is a view for explaining the operation of a blower fan in FIG. 11.
Figure 13:
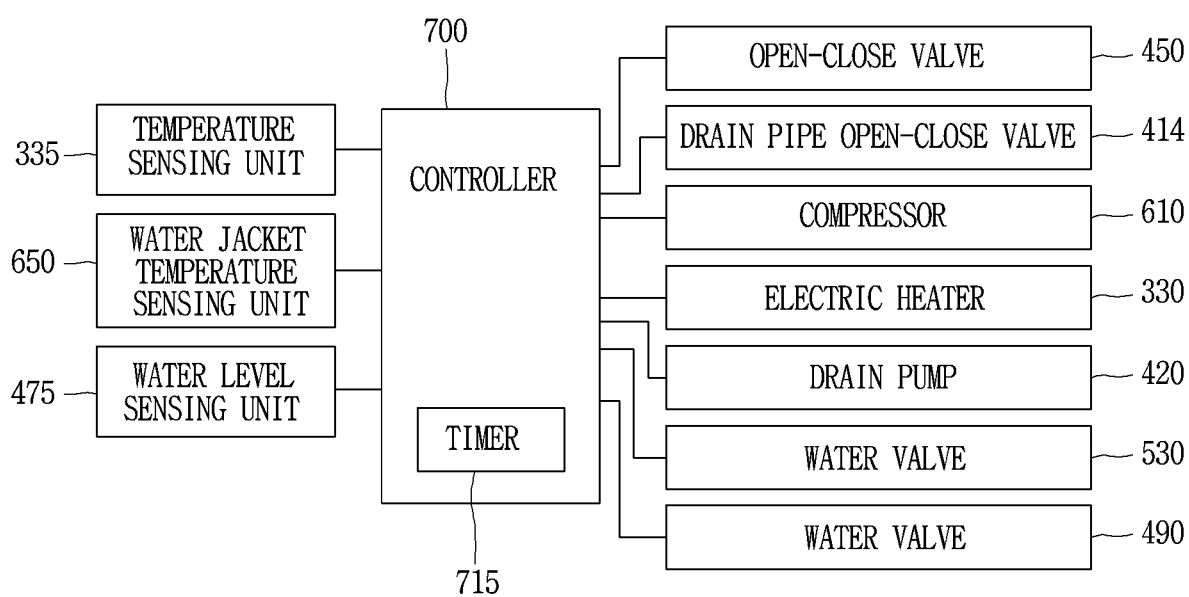
FIG. 13 is a control block diagram of the dishwasher in FIG. 11.

FIG. 11 is a partially enlarged view of a dishwasher having a heat pump according to another embodiment of the present disclosure, and FIG. 12 is a view for explaining the operation of a blower fan in FIG. 11, and FIG. 13 is a control block diagram of the dishwasher in FIG. 11. As illustrated in FIG. 11, the dishwasher of the present embodiment includes a dishwasher body 100 having a tub 140 configured with a washing space 142 therein and a sump 210 provided at a bottom of the tub 140 to temporarily accommodate washing water; a heat pump 600b having a compressor 610, a condenser 620b disposed in direct contact with washing water to be heated, an expansion apparatus 630 and an evaporator 640; a drain storage unit 430b connected to a drain pipe 412 of the sump 210 to temporarily store washing water discharged from the sump 210; a drain pipe open-close valve 414 that opens and closes the drain pipe 412; and a controller 700 (see FIG. 13) for controlling the heat pump 600b and the drain pipe open-close valve 414, wherein the evaporator 640 is disposed to exchange heat with the drain storage unit 430b; and the controller 700 is configured to control the drain pipe open-close valve 414 to move the washing water of the sump 210 to the drain storage unit 430b when the sump 210 is drained.

A lower spray arm 184 is provided in a lower region of the tub 140. A sump 210 is provided at the bottom of the tub 140. One side of the sump 210 is provided with a circulation pump 310 for pumping and circulating the washing water of the sump 210. A passage switching valve 350 is connected to the circulation pump 310, and a washing water guide 360 is connected to the passage switching valve 350. One side of the sump 210 is connected to a connection pipe 440, and the connection pipe 440 is provided with a connection pipe open-close valve 450. The sump 210 is provided with a filter unit 220. The filter unit 220 includes a first filter 221, a second filter 231, and a third filter 241.

One side of the sump 210 is provided with a heat exchanger 460. The heat exchanger 460 accommodates a heat transfer material 462 therein. The heat transfer material 462 is implemented with washing water as described above. The drain storage unit 430b and the evaporator 640 are installed inside the heat exchanger 460. As a result, when the washing water of the sump 210 is moved into the drain storage unit 430b, the drain storage unit 430b and the heat transfer material 462 are heat-exchanged, and the evaporator 640 exchanges heat with the heat transfer material 462 to increase the temperature.

Meanwhile, one side of the evaporator 640 and the drain storage unit 430b includes a blower fan 490 for blowing air that has passed through the compressor 610 toward the evaporator 640 and the drain storage unit 430b. The blower fan 490 is provided at one side of the compressor 610 (right side of the compressor 610 in the drawing). In the present embodiment, it is illustrated a case where the blower fan 490 is installed on the right side of the compressor 610, but it is merely an example and the present disclosure is not limited thereto. The blower fan 490 includes, for example, a fan 494 having a plurality of blades and a motor 495 for rotating the fan 494. The blower fan 490 has a housing 492 for supporting the fan 494 and the motor 495. The fan 494 is rotatably supported inside the housing 492.

The dishwasher of the present embodiment includes an air guide 480 for guiding air that has passed through the compressor 610 to the evaporator 640 and the drain storage unit 430b. The air guide 480 may be implemented to form a flow space 484 of the air therein. In the present embodiment, it is illustrated that the air guide 480 is implemented to surround the four surfaces (vertical and horizontal directions) of the evaporator 640 and the drain storage unit 430b, but it is merely an example, and it may be configured to surround the top and left and right surfaces to move the air that has passed through the compressor 610 toward the evaporator 640 and the drain storage unit 430b.

In the present embodiment, the air guide 480 is implemented to surround the heat exchanger 460 in which the drain storage unit 430b and the evaporator 640 are accommodated. The air guide 480 may further include an expansion section 482 configured to surround the compressor 610. The blower fan 490 may be disposed inside the expansion section 482.

By this configuration, as illustrated in FIG. 12, when the blower fan 490 is driven, air is sucked into the air guide 480, and the sucked air exchanges heat with the compressor 610 while passing through the compressor 610. The air the temperature of which is increased by exchanging heat with the compressor 610 is heat exchanged with the heat exchanger 460 while passing through the heat exchanger 460. The air that has passed through the heat exchanger 460 is discharged to the outside of the air guide 480.

FIG. 13 is a control block diagram of the dishwasher in FIG. 12. As illustrated in FIG. 13, the temperature sensing unit 335 and the water level sensing unit 475 are communicatively connected to the controller 700. The controller 700 is provided with a timer 715 for calculating the heating time of the washing water by the condenser 620b. The controller 700 is controllably connected to the connection pipe open-close valve 450 and the water valve 530, respectively, to control washing water supplied into the tub 140. The controller 700 is controllably connected to the drain pipe open-close valve 414 and the drain pump 420, respectively, to drain the washing water of the sump 210.

The compressor 610 is controllably connected to the controller 700 so as to heat washing water using the heat pump 600b. An electric heater 330 is controllably connected to the controller 700 to heat the washing water when power is applied. The controller 700 is controllably connected to the blower fan 490 to allow air that has passed through the compressor 610 to be blown toward the evaporator 640 and the drain storage unit 430b. The controller 700 may be configured to control the operation of the blower fan 490 to be stopped when a predetermined period of time elapses subsequent to stopping the operation of the compressor 610.

By this configuration, when washing or rinsing the dishes using the heated washing water, the controller 700 may control washing water to be supplied into the washing water storage unit 510 of the water jacket 500 and then control the compressor 610 to be driven. Refrigerant compressed by the compressor 610 is moved to the condenser 620b provided in the water jacket 500 to heat the washing water of the water jacket 500.

When the heating of the washing water of the water jacket 500 is completed, the controller 700 may control the connection pipe open-close valve 450 to move the heated washing water to the sump 210, and then control the circulating pump 310 to circulate washing water to wash dishes.

On the other hand, the controller 700 may control the blower fan 490 to be driven during the operation of the compressor 610. When the blower fan 490 is driven, air is sucked into the air guide 480, and the sucked air is heat-exchanged with the compressor 610 to cool the compressor 610. Air the temperature of which is increased by exchanging heat with the compressor 610 is in contact with the heat exchanger 460 to exchange heat. The temperature of the heat exchanger 460 heat-exchanged in contact with the air having the increased temperature may increase. As a result, the temperature of the heat transfer material 462 inside the heat exchanger 460 is increased, and the heat transfer material 462 having the increased temperature exchanges heat with the evaporator 640. The temperature of the evaporator 640 is increased by the heat transfer material 462, and the evaporation of refrigerant inside the evaporator 640 may be promoted. The controller 700 calculates an elapsed time subsequent to stopping the operation of the compressor 610 through the timer 715 when the operation of the compressor 610 is stopped, and controls the operation of the blower fan 490 to be stopped when the calculation time passes a preset period of time.

The controller 700 may control the drain pipe open-close valve 414 to discharge the washing water of the sump 210 to the drain storage unit 430b when washing (or rinsing) using the heated washing water is completed. When the drain pipe open-close valve 414 is opened, the washing water of the sump 210 is moved into the drain storage unit 430b. When high temperature washing water flows into the drain storage unit 430b, the temperature of the drain storage unit 430*b* may be increased, and the temperature of the heat transfer material 462 in contact with the drain storage unit 430*b* is increased. As a result, the latent heat absorption of the evaporator 640 may be facilitated.

The controller 700 may calculate a heat exchange time between the drain storage unit 430*b* and the heat transfer material 462 through the timer 715 when washing water is drained into the drain storage unit 430*b*, and control the drain pump 420 to allow the washing water of the drain storage unit 430*b* to be drained to the outside when the calculated heat exchange time has passed a predetermined period of time.

As described above, preferred embodiments of the present invention are illustrated and described herein with reference to the accompanying drawings. However, the present disclosure may be implemented in various embodiments without departing from the concept or gist of the invention, and thus the foregoing embodiments should not be limited to the content of the detailed description.

Furthermore, the foregoing embodiments should be broadly construed within the scope of the technical concept defined by the appended claims even though they are not specifically disclosed in the detailed description herein. Moreover, all changes and modifications within the technical scope of the claims and the equivalent scope thereof should be construed to be included in the appended claims.

What is claimed is:

1. A dishwasher comprising:
a dishwasher body comprising a tub that defines a washing space and a sump that is disposed vertically below the tub and that is configured to receive washing water;
a drain pipe connected to the sump and configured to discharge washing water in the sump;
a drain pipe open-close valve configured to open and close the drain pipe;
a heat pump comprising a compressor, a condenser, an expansion apparatus, and an evaporator;
a drain storage unit connected to the drain pipe and configured to receive washing water discharged from the sump, the drain storage unit being configured to exchange heat with the evaporator;
a heat exchanger that accommodates both of the drain storage unit and the evaporator and is configured to exchange heat with the drain storage unit and the evaporator;
a washing water inlet pipe configured to supply washing water to the heat exchanger; and
a controller configured to control the heat pump and the drain pipe open-close valve,
wherein the controller is configured to control the drain pipe open-close valve to open the drain pipe to thereby supply washing water in the sump to the drain storage unit, and
wherein the heat exchanger is configured to accommodate a heat transfer material therein that is in contact with the drain storage unit and the evaporator, the heat transfer material being the washing water received through the washing water inlet pipe.

2. The dishwasher of claim 1, further comprising:
a washing water inlet pipe valve configured to open and close the washing water inlet pipe; and
a water level sensing unit configured to sense a level of washing water in the heat exchanger,
wherein the controller is configured to:
determine a level of the heat transfer material in the heat exchanger based on the level of washing water sensed by the water level sensing unit, and
control the washing water inlet pipe valve to open the washing water inlet pipe to supply washing water to the heat exchanger based on the level of the heat transfer material corresponding to a preset level.

3. The dishwasher of claim 1, wherein the drain storage unit defines a through portion that passes therethrough and that increases a contact area between the drain storage unit and the heat transfer material.

4. The dishwasher of claim 1, further comprising a communication pipe that is connected to the drain storage unit and that is configured to allow communication between an inside of the drain storage unit and an outside of the drain storage unit.

5. The dishwasher of claim 1, further comprising:
a drain pump configured to pump out washing water in the drain storage unit,
wherein the controller is configured to control the drain pump to drain washing water in the drain storage unit based on an elapse of a preset period of time from a reference time point.

6. The dishwasher of claim 1, wherein the dishwasher body defines an inner space that accommodates the compressor, and
wherein the evaporator and the drain storage unit are disposed in the inner space of the dishwasher body.

7. The dishwasher of claim 6, further comprising a blower fan disposed at one side of the compressor and configured to blow air toward the evaporator and the drain storage unit through the compressor.

8. The dishwasher of claim 7, further comprising:
an air guide configured to guide air that has passed through the compressor toward the evaporator and the drain storage unit.

9. The dishwasher of claim 8, wherein the air guide defines an air flow space in which the evaporator and the drain storage unit are disposed.

10. The dishwasher of claim 9, wherein the compressor is disposed inside the air guide.

11. The dishwasher of claim 1, wherein the condenser is configured to directly contact and heat washing water.

12. The dishwasher of claim 11, wherein the condenser is disposed inside the sump.

13. The dishwasher of claim 11, further comprising a water jacket that is disposed at the dishwasher body and that comprises a washing water storage unit configured to communicate washing water with the sump,
wherein the condenser is disposed inside the washing water storage unit.

14. The dishwasher of claim 13, further comprising:
a connection pipe that connects the water jacket to the sump and that is configured to supply washing water in the washing water storage unit to the sump;
a connection pipe open-close valve configured to open and close the connection pipe; and
a water jacket temperature sensing unit disposed at the water jacket and configured to sense a temperature of washing water in the washing water storage unit,
wherein the controller is configured to control the connection pipe open-close valve to supply washing water in the washing water storage unit to the sump based on completion of heating of washing water in the washing water storage unit.

15. The dishwasher of claim 1, further comprising a circulation pump connected to the sump and configured to circulate washing water in the sump, the circulation pump comprising:

an electric heater disposed inside the circulation pump and configured to heat washing water in the circulation pump, and a temperature sensing unit configured to sense a temperature of washing water in the circulation pump.

16. The dishwasher of claim 1, wherein the sump comprises a filter unit configured to block contaminants in washing water in the sump, the filter unit comprising:

a first filter disposed at an upper opening of the sump that faces a bottom surface of the tub, a second filter disposed inside the sump, and a third filter disposed inside the second filter, and wherein the condenser is disposed between the first filter and the second filter.

17. The dishwasher of claim 1, wherein the evaporator comprises:

a plurality of horizontal sections that extend parallel to one another; and a plurality of connection sections that connect the plurality of horizontal sections to one another.

18. The dishwasher of claim 1, wherein the evaporator is located above the drain storage unit within the heat exchanger.

19. The dishwasher of claim 1, wherein the drain pipe is configured to supply the washing water in the sump to an inside of the drain storage unit, and wherein the washing water inlet pipe is spaced apart from the drain pipe and configured to supply the washing water in the sump to outsides of the evaporator and the drain storage unit that are disposed within the heat exchanger.

20. The dishwasher of claim 1, wherein the washing water inlet pipe is connected to a first position of the sump, and the drain pipe is connected to a second position of the sump that is different from the first position.

* * * * *